(12) United States Patent
Gottlieb

(10) Patent No.: US 6,182,473 B1
(45) Date of Patent: Feb. 6, 2001

(54) I.S. MACHINE

(75) Inventor: Russell Bruce Gottlieb, Canton Center, CT (US)

(73) Assignee: Emhart Glass S.A., Cham (CH)

( * ) Notice: Under 35 U.S.C. 154(b), the term of this patent shall be extended for 0 days.

(21) Appl. No.: 09/301,047

(22) Filed: Apr. 28, 1999

Related U.S. Application Data

(63) Continuation-in-part of application No. 09/260,114, filed on Mar. 2, 1999, now Pat. No. 6,109,063.

(51) Int. Cl.⁷ ............................ C03B 9/38; C03B 11/12
(52) U.S. Cl. ........................ 65/173; 65/267; 65/319; 65/356; 65/357; 65/359
(58) Field of Search ............................ 65/170, 171, 172, 65/173, 355, 356, 323, 319, 267, 357, 359

(56) References Cited

U.S. PATENT DOCUMENTS

| | | | |
|---|---|---|---|
| Re. 34,048 | * 9/1992 | Bolin | 65/265 |
| 3,580,712 | * 5/1971 | Mumford | 65/323 |
| 3,586,491 | * 6/1971 | Mennitt | 65/355 |
| 4,388,099 | * 6/1983 | Hermening et al. | 65/267 |
| 4,502,879 | * 3/1985 | Foster | 65/267 |
| 4,561,875 | * 12/1985 | Foster | 65/267 |
| 4,655,813 | * 4/1987 | Nebelung | 65/359 |
| 4,842,637 | * 6/1989 | Bolin et al. | 65/265 |
| 4,909,823 | * 3/1990 | Bolin et al. | 65/265 |
| 5,059,236 | * 10/1991 | Ito | 65/319 |
| 5,516,352 | * 5/1996 | Bogert et al. | 65/265 |
| 5,830,254 | * 11/1998 | Roberts et al. | 65/359 |

* cited by examiner

Primary Examiner—Sean Vincent
(74) Attorney, Agent, or Firm—Spencer T. Smith

(57) ABSTRACT

A mold opening and closing mechanism for a section of an I.S. machine includes a mold carrier assembly and horizontal axially extending shafts. A housing supports these shafts for axial displacement and includes first and second vertically extending ducts which terminate at their tops with a sleeve. A manifold assembly includes a manifold including a plenum which overlies each of the mold halves. A spacer secured beneath said frame and having vertically extending holes communicates with the downwardly opening exit of the plenum for delivering cooling air from the plenum to the vertical cooling air passages of the mold halves. The manifold includes a pair of horizontally extending cylindrical inlet holes A pair of cylindrical tubes are received by the cylindrical holes and first and second elbows connect a second end of each of the cylindrical tubes to the sleeves so that cooling air from the ducts will be delivered to the pair of tubes. Each of the pair of cylindrical tubes has a length selected so that the tubes will be received by the cylindrical holes as the carrier/insert means is displaced between the retracted and advanced positions. Secured intermediate the manifold and the mold carrier is a device which can separate and maintain separated the manifold and the mold carrier so that the blank molds can be removed from the mold carrier.

2 Claims, 3 Drawing Sheets

I.S. MACHINE

This is a continuation-in-part application of Ser. No. 09/260,114, which was filed on Mar. 2, 1999 now U.S. Pat. No. 6,109,063, which is incorporated by reference herein.

The present invention relates to I.S. (individual section) machines which transform gobs of molten glass into bottles in a two step process and more particularly to the mechanism for cooling the blankmolds of that machine.

BACKGROUND OF THE INVENTION

The first I.S. machine was patented in U.S. Pat. Nos. 1,843,159, dated Feb. 2, 1932, and 1,911,119, dated May 23, 1933. An I.S. (individual section) machine has a plurality of identical sections (a section frame in which and on which are mounted a number of section mechanisms) each of which has a blank station which has one or more blank molds for receiving a corresponding number of gobs of molten glass. The received gobs are formed into parisons having a threaded opening at the bottom (the finish) and a blow station which receives the parisons and forms them into bottles standing upright with the finish at the top. The more effective the heat transfer from a gob of molten glass within a blankmold, the quicker the forming process.

Conventionally, the blankmolds are formed with a series of vertical holes and cooling air is either directed upwardly through these holes (bottom up) or downwardly through these holes (top down). The most recent design for an I.S. machine is disclosed in U.S. Pat. No. 5,830,254 and a conventional system for supplying top down cooling air is shown in U.S. Pat. No. 4,561,875. Such manifolds interfit with the blank molds making removal of the blank molds difficult. An operator conventionally uses a crowbars to separate the manifold from the blank molds thereby making it possible for a second operator to remove the blank molds.

OBJECT OF THE INVENTION

It is an object of the present invention to provide an improved top down air cooling system for blank molds in such a machine.

It is also an object of the present invention to provide an improved top down air cooling system for blank molds in an I.S. machine wherein blank molds can be changed by a single operator.

Other objects and advantages of the present invention will become apparent from the following portion of this specification and from the accompanying drawings which illustrate a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
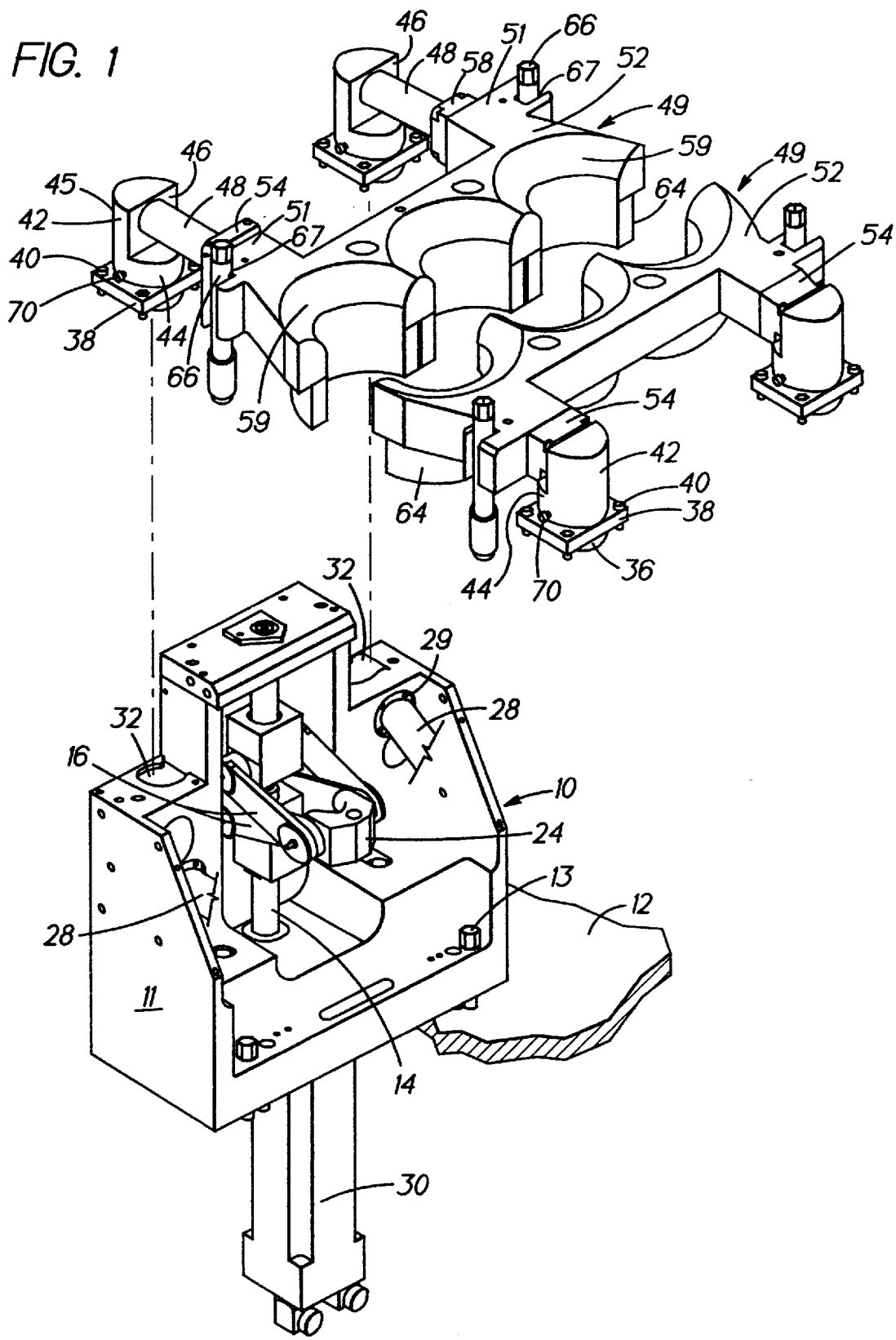
FIG. 1 is a side elevational view, partly in section, of half of the top down cooling system made in accordance with the teachings of the present invention.

A gob of molten glass is formed into a parison at the blank station of a section of an I.S. machine. The blank station has a mold opening and closing mechanism which includes a pair of opposed drive assemblies 10 (only one is illustrated for clarity) each of which has a housing 11 secured to the section frame or box 12 by suitable fasteners 13. The housing 11 supports a vertical ball screw 14 which drives a pair of nuts 15 connected to the left hand end of corresponding links 16. The right hand end of each link is connected via a horizontal shaft 22 (FIG. 2) to a yoke 24 which is interconnected with a carrier 25 via a vertical shaft (not shown).

The gob is formed in a blankmold which includes a pair of opposed blankmold halves 26. Each blankmold half is carried by one or more inserts 27 which are supported by the carrier 25. The carrier is secured to a pair of round shafts 28 which are slidingly received in suitable bearings 29. The carrier is displaceable between an advanced position (FIG. 2) whereat the illustrated blankmold half will be in engagement with the other blankmold half and a retracted, mold open position, where the carrier will be proximate the housing, by driving the ball screw with a suitable motor 30. Complete details of such a mold opening and closing mechanism are disclosed in the above referred to U.S. Pat. No. 5,830,254, which is incorporated by reference herein. Each blankmold half has a series of vertical cooling holes 31 which extend from its top to its bottom.

Figure 2:
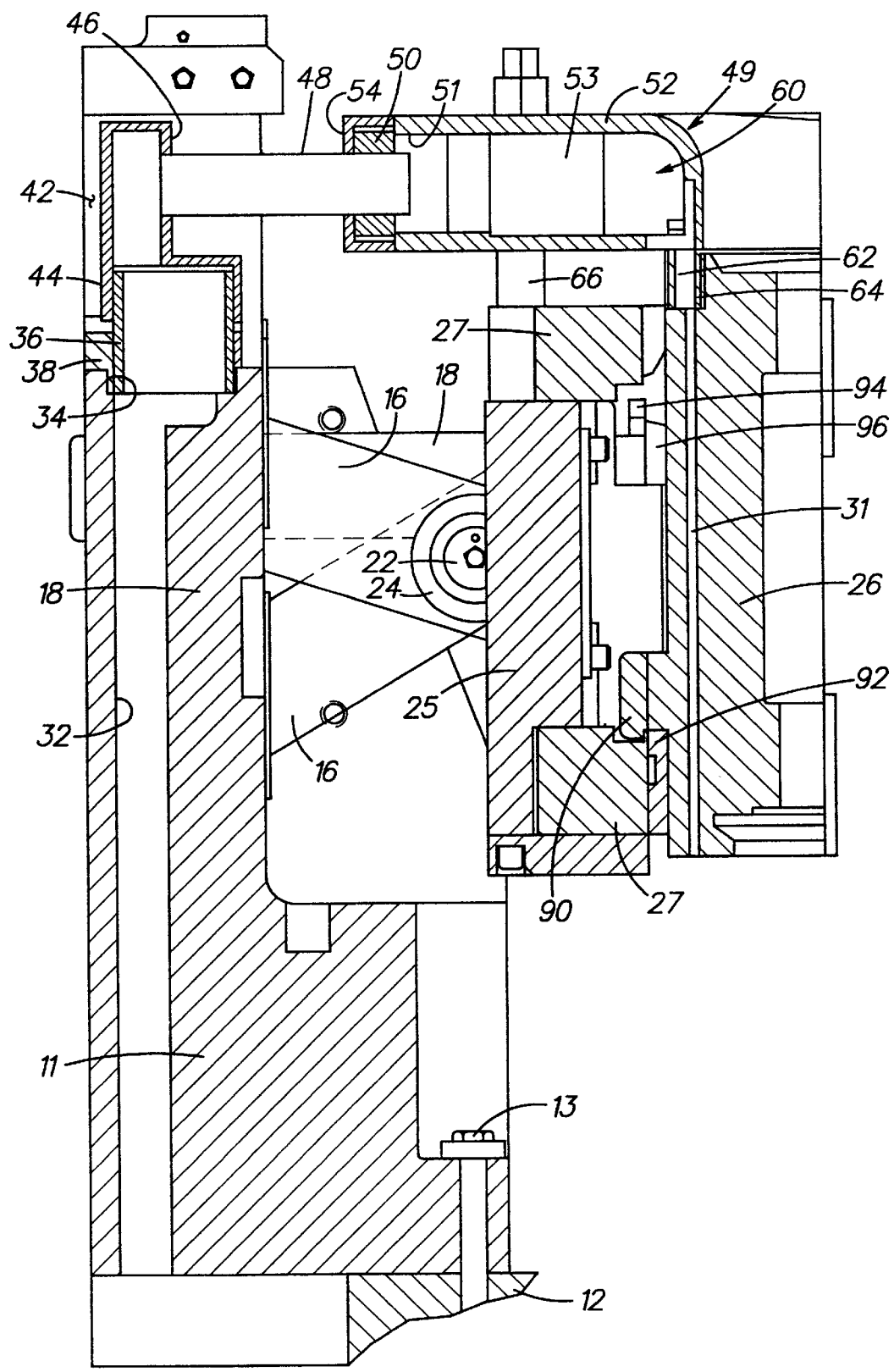
FIG. 2 is an oblique view of the manifold portion of the system shown in FIG. 1.

Cooling air is supplied through a pair of ducts 32, which extend from the bottom to the top of the housing 18 at either side of the housing. These ducts 32, which bend around the round shaft holes, terminate at the top of the housing with a circular recess 34 which receives the bottom of a cylindrical locating sleeve 36 secured within a mounting collar 38 which is fixed to the housing with suitable screws 40 (FIG. 2). Slidingly received on the top portion of each locating sleeve 36 is an "L" shaped elbow 42 which has a vertical portion 45 having a cylindrical base 44 for sliding onto the sleeve and an upper portion which has a flat vertical face 46 connected to a horizontally extending tube 48.

Associated with each housing is a manifold 49 which will deliver cooling air to one set of the blankmold halves supported by one of the carriers. The free end of each of the tubes (FIG. 1) is slidingly received by an oil impregnated bronze bushing 50 which is retained adjacent the corresponding inlet 51 of the frame 52 of the manifold 49, by an end cap 54. These plenum inlets 51 communicate with inlets 53 to a plenum chamber 60 which includes three continuous semi circular portions 59 corresponding to the semi-circular tops of three blankmold halves that would be present in an I.S. section producing three bottles each cycle. Each semiannular plenum portion 59 communicates with a semiannular vertical slot 62, defined in a spacer 64 which is connected to the manifold by means of a number of screws (not shown) which extend upwardly through the spacer into the manifold frame. These semi-annular slots overlie the series of cooling holes 31 in corresponding blankmolds 10.

The manifold assembly (the interconnected manifold and spacer) sits on top of the inserts 27 with movement relative to the carrier/inserts restricted by a pair of vertical screws 66 which are secured to the top of the carrier and which are located in suitable slots 67 in the manifold frame 52 (the manifold assembly may accordingly be lifted to change the blankmold halves). A set screw 70 secures the elbow 42 to the sleeve 36 accommodating a limited amount of vertical adjustment. To accommodate a much taller set of blankmolds, the sleeves 36 and spacers can be exchanged with taller sleeves and spacers.

Figure 3:
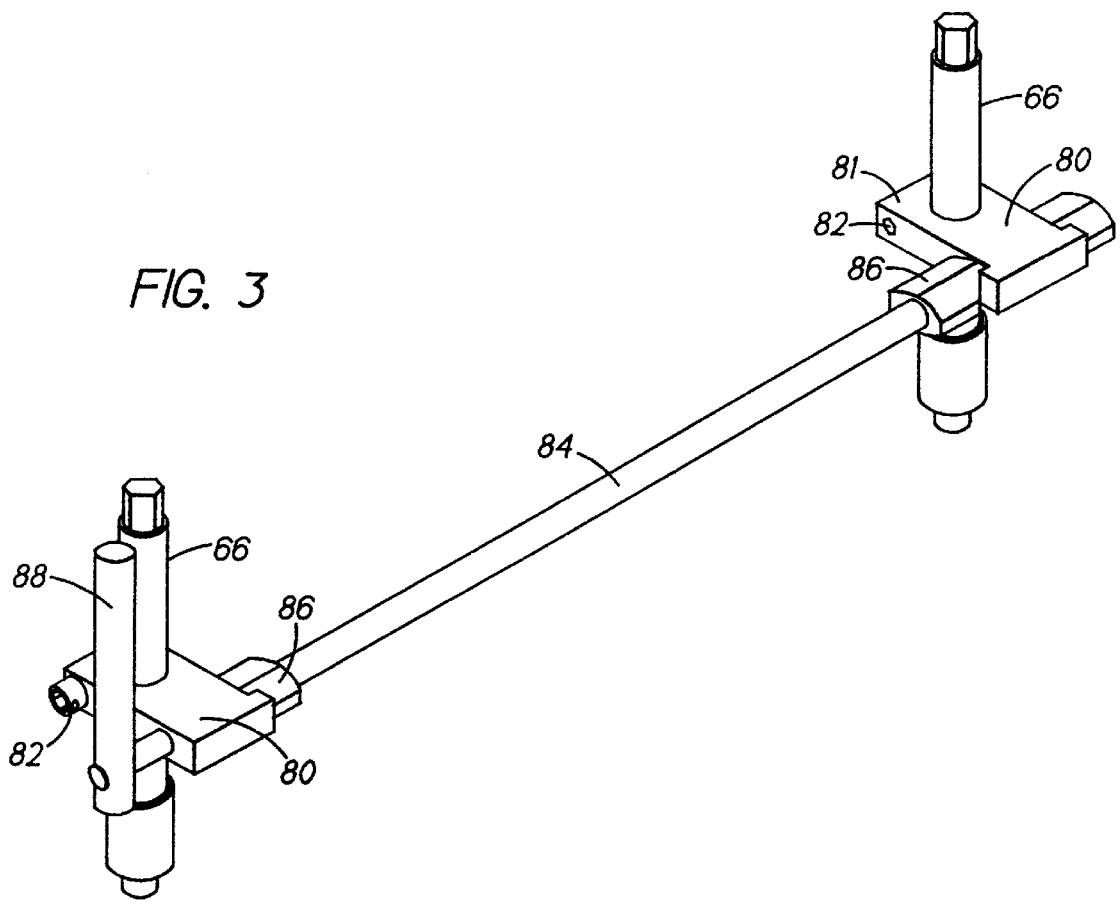
FIG. 3 is an oblique view of a device for separating the cooling air manifold and the blank molds, in a first condition.
Figure 4:
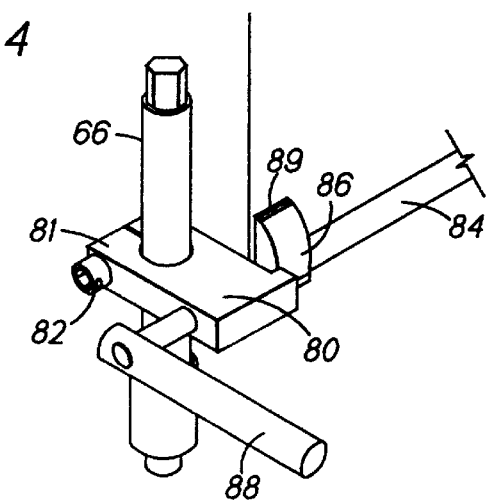
FIG. 4 is an oblique view of a portion of the device for separating the cooling air manifold and the blank molds shown in FIG. 3, in a second condition.

Secured to each of the pair of vertical screws 66, immediately below the frame 52 of the manifold 49 is a bracket 80. Each bracket has a split clamp portion 81 which can be clamped to the associated screw with a fastener 82. Pivotally supported by each pair of brackets is a pivot shaft 84 to which are secured identical cams 86. The pivot shaft can be rotated with a handle 88 secured at one end of the shaft to rotate the cams from a first orientation shown in FIG. 3 where they are horizontal to a second orientation shown in FIG. 4 where the end 89 of the cams engages the bottom of the manifold frame slightly past center. The manifold frame is elevated in the process separating the manifold assembly (the bottom surface of the spacer 64) and the top of the blank molds sufficiently to allow an operator to lift the blank molds off of the mold carrier inserts (a downwardly projecting lip 90 interconnects with an upwardly extending catch 92 and a button 94 catches an upstanding flange 96). With the line of engagement being past center, the manifold assembly will be maintained at its fully lifted position until the operator displaces the horizontal handle back to its original vertical position.

What is claimed is:

1. A mold opening and closing mechanism for a section of an I.S. machine comprising at least one mold half having vertical cooling air passage means, a mold carrier assembly including carrier/insert means for supporting said at least one mold half, a manifold assembly including a manifold including a plenum including a portion for overlying each of said at least one mold half, the at least one plenum portion having downwardly opening exit means, a spacer secured beneath said frame and having vertically extending spacer hole means communicating with the downwardly opening exit means of each of the at least one plenum portion for delivering cooling air from the plenum to the vertical cooling air passage means of the at least one mold half, quide means for controlling the displacement of said manifold relative to said mold carrier including a pair of vertical screws secured to said mold carrier and a pair of vertical slots in said manifold for receiving said vertical screws, and a lifting device extending between said vertical screws including a bracket releasably secured to each vertical screw, a shaft pivotally secured proximate each end to one of said brackets, and cam means secured to said shaft and configured so that said manifold assembly will rest on said blank molds when at a first orientation and so that said manifold assembly will be selectively separated from said blank molds when at a second orientation.

2. A mold opening and closing mechanism for a section of an I.S. machine according to claim 1, wherein said lifting device further comprises a handle secured to one end of said shaft.

\* \* \* \* \*